(12) United States Patent
Sacks

(10) Patent No.: US 7,698,832 B2
(45) Date of Patent: Apr. 20, 2010

(54) FLAT AND THIN TAPE MEASURE

(76) Inventor: Jerome Elliot Sacks, 8 Thoreau Rd., Lexington, MA (US) 02420

( * ) Notice: Subject to any disclaimer, the term of this patent is extended or adjusted under 35 U.S.C. 154(b) by 43 days.

(21) Appl. No.: 12/284,534

(22) Filed: Sep. 23, 2008

(65) Prior Publication Data
US 2009/0172964 A1 Jul. 9, 2009

Related U.S. Application Data

(60) Provisional application No. 60/995,437, filed on Sep. 26, 2007.

(51) Int. Cl.
*G01B 3/10* (2006.01)
(52) U.S. Cl. .......................... 33/755; 33/760
(58) Field of Classification Search .................. 33/755, 33/759, 760, 769
See application file for complete search history.

(56) References Cited

U.S. PATENT DOCUMENTS

| | | | | |
|---|---|---|---|---|
| 1,750,370 A | * | 3/1930 | Straus | 33/755 |
| 3,292,261 A | * | 12/1966 | Hayes | 33/759 |
| 4,211,011 A | * | 7/1980 | Jacobson | 33/15 |
| 4,688,653 A | * | 8/1987 | Ruble | 33/759 |
| 5,845,413 A | * | 12/1998 | Zayat, Jr. | 33/760 |
| 6,772,532 B1 | * | 8/2004 | Honea | 33/759 |
| 7,249,423 B2 | * | 7/2007 | Sieber | 33/755 |
| 7,617,615 B1 | * | 11/2009 | Martorell et al. | 33/759 |
| 2002/0149198 A1 | * | 10/2002 | Legg | 283/115 |
| 2002/0157273 A1 | * | 10/2002 | Noyes | 33/759 |

OTHER PUBLICATIONS

FortPromo.com, Item No. 34680, 5' Business Card Tape Measure (1 attch).

* cited by examiner

*Primary Examiner*—G. Bradley Bennett
(74) *Attorney, Agent, or Firm*—Jerome E Sacks

(57) ABSTRACT

A tape measure is invented that fits in an auxiliary pocket such as a credit card pocket of a wallet. The tape measure consists of a case that fits in the auxiliary pocket, a rectangular card that fits in the case, and a tape measure ribbon with a width at most half the width of the card. When the tape measure is in the retracted mode, the ribbon is wrapped nicely around the card and the wrapped ribbon is inserted in the case. To extend the tape measure, the wrapped card is removed from the case and the ribbon is unwrapped from the card so it functions as an ordinary tape measure ribbon. In an example given in one embodiment, a tape measure is sized to fit in a credit card pocket, has a thickness of less than the thickness of three credit cards, yet extends to 40 inches.

6 Claims, 5 Drawing Sheets

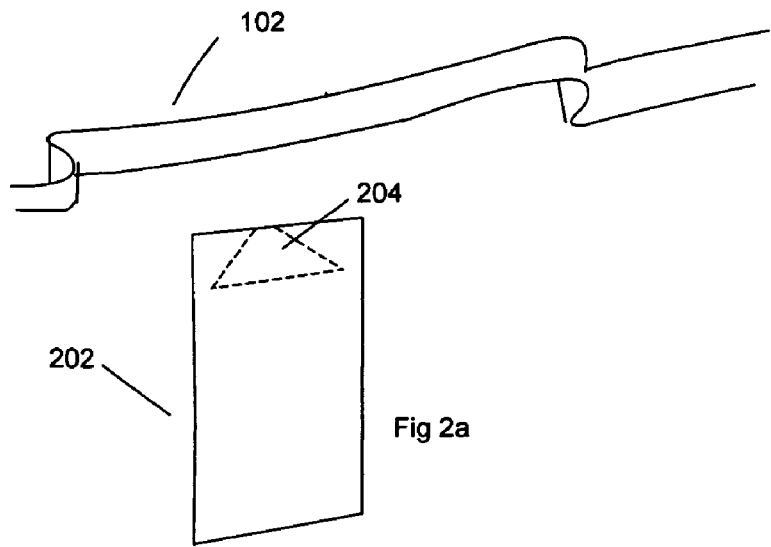
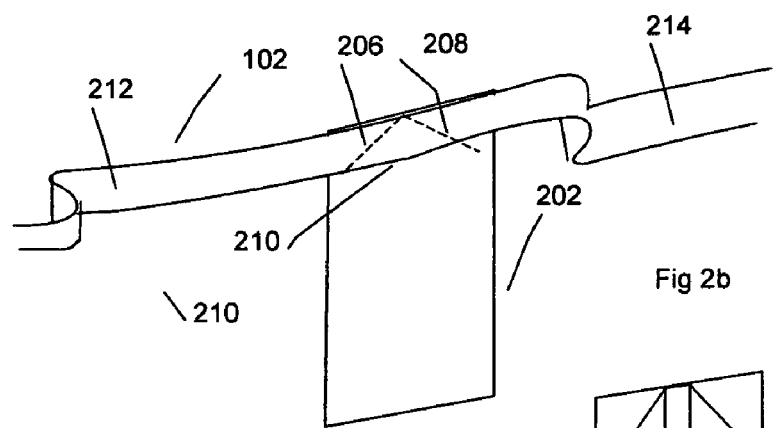
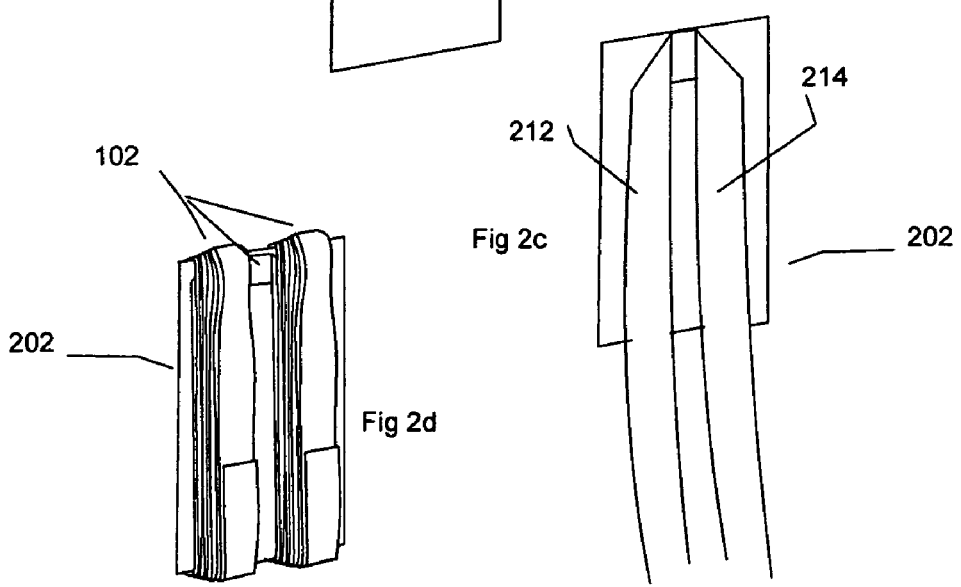

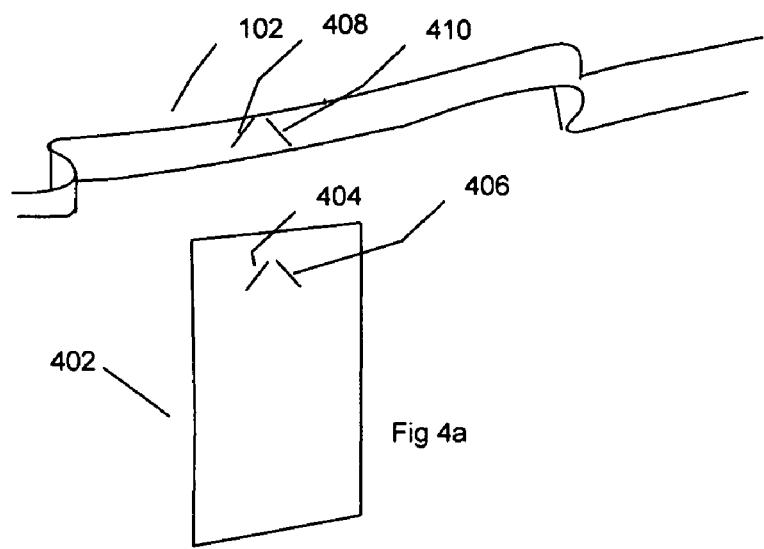
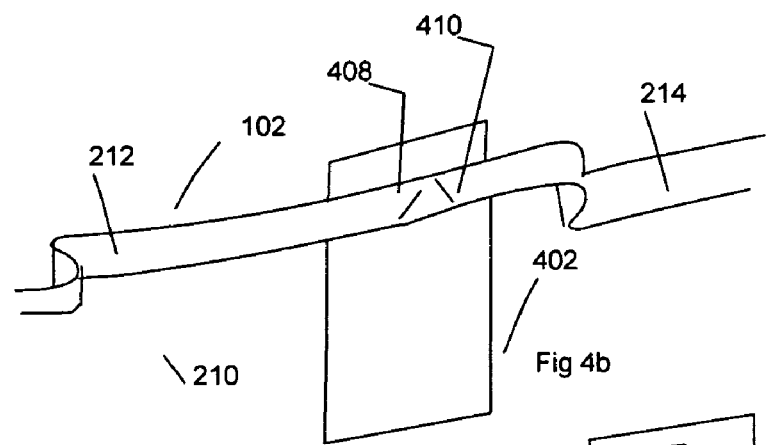
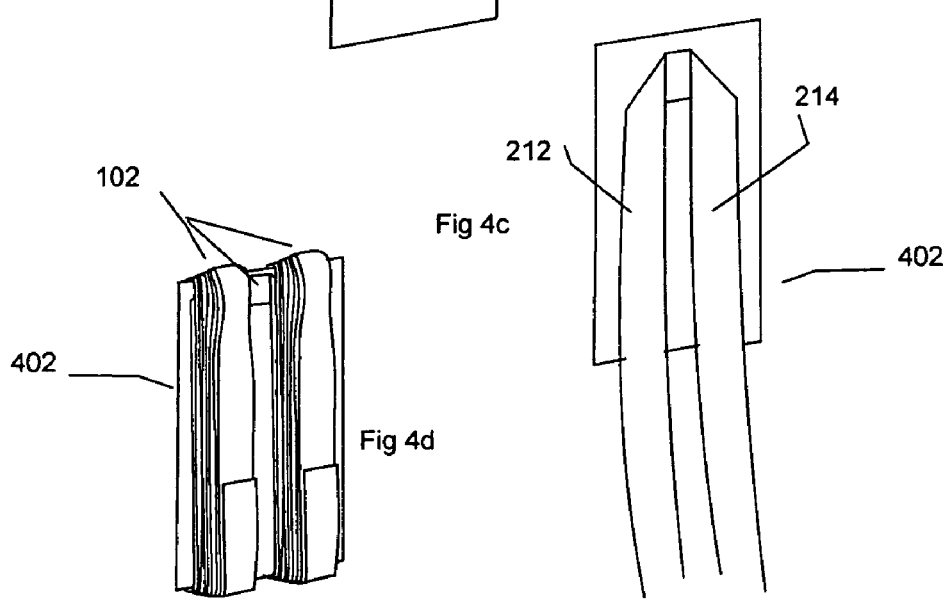

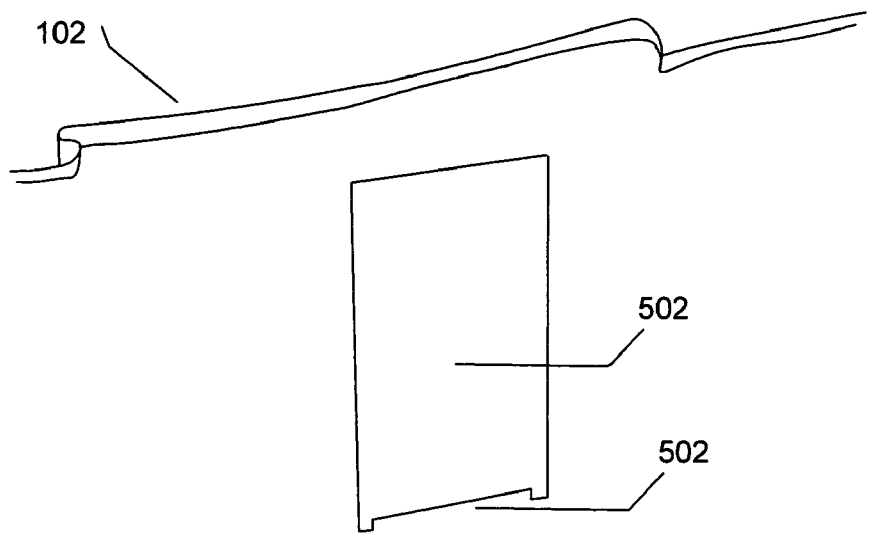
Fig 5a
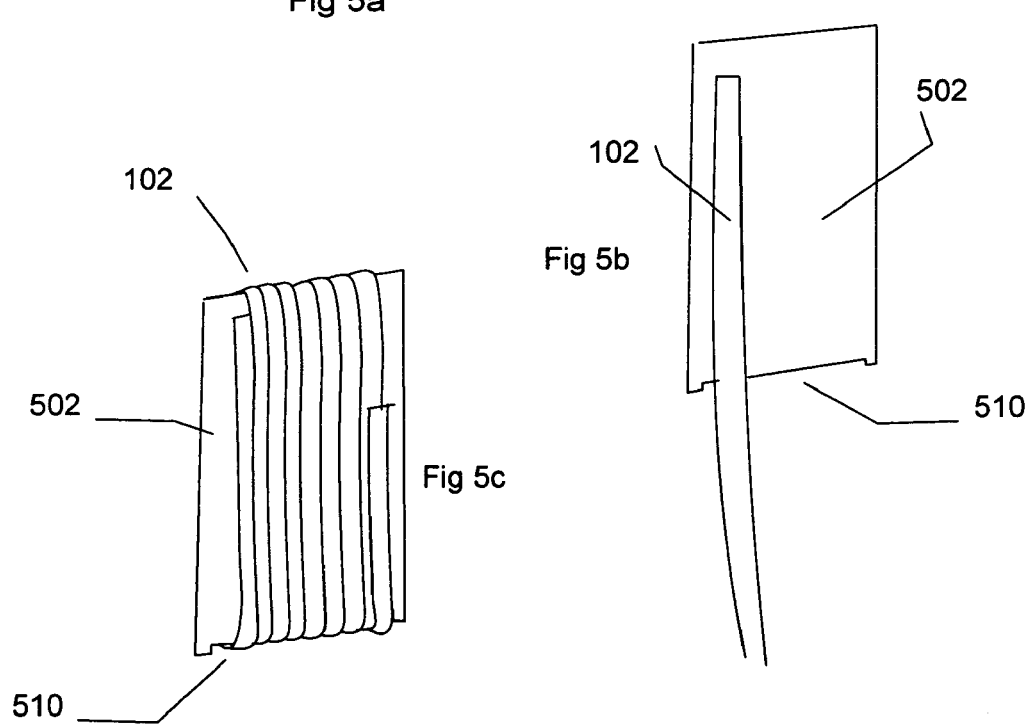
Fig 5b
Fig 5c

FLAT AND THIN TAPE MEASURE

CROSS-REFERENCE TO RELATED APPLICATIONS

This application claims the benefit of the following provisional patent application filed by the present inventor:
Ser. No. 60/995,437 filed 2007 Sep. 26

FEDERALLY SPONSORED RESEARCH

NONE

SEQUENCE LISTING

NONE

BACKGROUND OF THE INVENTION

1. Field of the Invention

This invention relates to tape measures, more particularly to tape measures that retract flat and thin so they fit snugly in a pocket such as a credit card or auxiliary pocket of a wallet or in a pocket located on the inside cover of a notebook.

2. Terms

The terms tape measure ribbon, tape measure, extended mode, retracted mode, standard credit card, extensible, tape measure thickness, auxiliary pocket, wrapped nicely and sized used in this application are defined below.

Tape measure ribbon (ribbon for short): Tape measure ribbon refers to a long, thin strip of flexible non-extensible material (102 in all the figures) containing numeric and tick indicia that is used for taking linear measurements.

Tape measure: Tape measure refers to the ribbon and additional components, if present, of a specific product.

Modes: Tape measures have two modes, an extended mode where the ribbon is extended, fully or partially, so the tape measure ribbon can be used for measuring, and a retracted mode when the tape measure is configured for storage.

Standard credit card: A credit card of approximate dimensions 5.5 cm (2.2 inches) by 8.5 cm (3.3 inches) by 35 mil where a mil is 0.0.00254 cm (one thousandth of an inch).

Extensible: stretchable, as in a rubber band.

Tape measure thickness: Tape measure thickness is defined herein as the smaller of the thickness of the tape measure width or height when it is in its retracted mode.

Figure 1A:
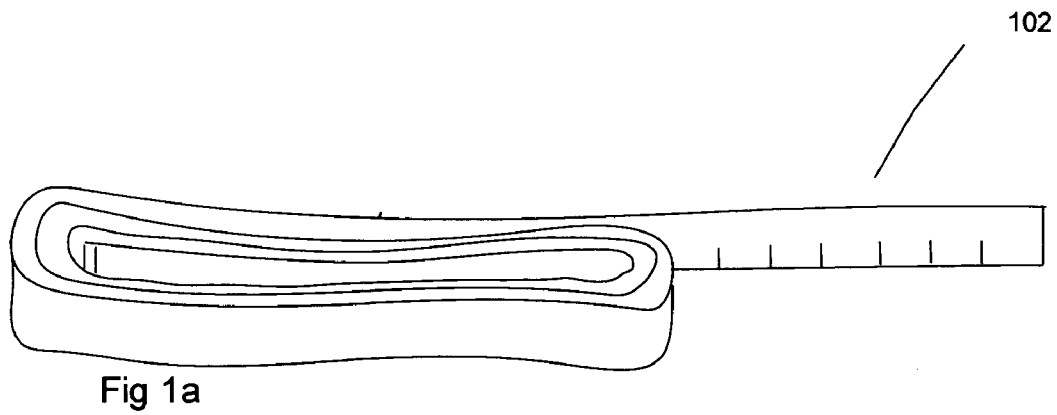
Figure 1B:
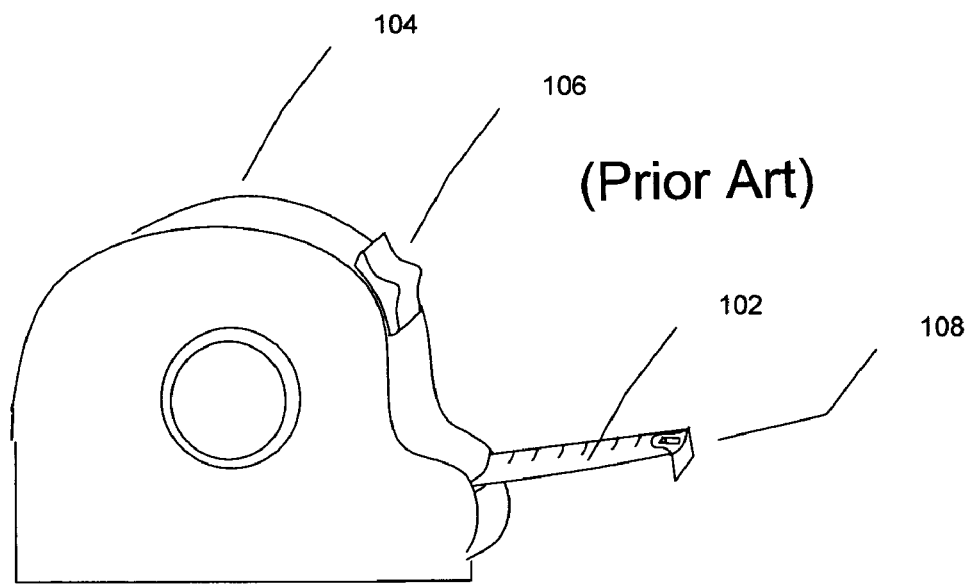

For example, the tape measure thickness in FIG. 1a depends on precisely how it is coiled and flattened in its retracted mode. Its thickness will either be approximately the thickness of the ribbon multiplied by the number of folded ribbon segments or the width of the ribbon, whichever is smaller. The tape measure thickness is FIG. 1b is the thickness of its case. The tape measure thickness shown in FIG. 3b (embodiment one of this invention) is the thickness of the case containing the folded ribbon and card when the tape measure is in the retracted mode.

If the auxiliary pocket is a credit card pocket, it is convenient to relate tape measure thickness to the thickness of a standard credit card. A tape measure thickness of less than three standard credit cards is equivalent to a tape measure thickness of less than 0.27 cm (0.105 inch).

Auxiliary pocket: An auxiliary pocket in this document is a pocket designed to hold thin items such as a credit card, business card, sheets of paper or index cards. Examples of auxiliary pockets to which this invention is directed are credit card or business card pockets found in wallets, activity planners or organizers, or a pocket located on the inside cover of a loose-leaf notebook that can hold several sheets of paper. The size of the auxiliary pocket may range from the size of a credit card or smaller to 8 inches by 11 inches or larger.

Wrapped nicely: A tape measure ribbon is wrapped nicely around a card if the wrapped ribbon covers over 65 percent of the surface area of the card.

Sized: A flat and thin tape measure is sized by specifying the width, height or length, and thickness of each tape measure component (ribbon, card and case) that is chosen to achieve a given objective such as enabling the tape measure to fit snugly in a credit card pocket of a wallet.

3. Description and Related Art

There are basically two kinds of commercially available tape measures, the standalone tape measure as shown in FIG. 1a consisting of the ribbon only, and the retractable tape measure shown in FIG. 1b. The standalone tape measure may optionally come with a case; a case is not show in FIG. 1a.

The retractable tape measure of FIG. 1b has a ribbon similar to the standalone tape measure, but has additional components (case 104, spring mechanism internal to the case (not shown in the figure), locking mechanism 106 and flange 108 and features (concave ribbon that provides rigidity to the ribbon when extended but lies flat when retracted) that make the tape measure easy to use. Other versions of the retractable tape measure have external windup cranks instead of internal springs. These windup tape measures can accommodate ribbons with lengths of 300 feet or more.

In spite of the extensive variability of tape measure products on the market, almost all commercial tape measures fall into one of these two basic categories: the retractable tape measure and the standalone tape measure. Furthermore, all these tape measure products are portable; many will fit in a pocket or purse. Miniature versions of the retractable tape measures are commercially available that are small enough to be attached to a keychain; have a thickness of about a half of an inch or less, and are inexpensive enough to be given out as a free promotional product, usually with advertising indicia on the case or ribbon.

The inventive concept presented in this document introduces a novel third category of tape measures: the flat and thin tape measure. Specifically, the flat and thin tape measure, when in its retracted mode, has width and height that is sized to fit snugly in an auxiliary pocket such as a credit card pocket of a wallet or an auxiliary pocket of a notebook. If it is sized to fit in a credit card pocket, the tape measure thickness may be required to be approximately the thickness of from one or several standard credit cards. Furthermore the flat and thin tape measure is durable and easy to use, and can be designed to accommodate lengths from as little as three feet or less to many yards, depending on its intended use.

There are measuring instruments both in the patent literature and in the marketplace that relates to, but do not achieve, these objectives. US Patent Application Publication 2002/0149198, published Oct. 17, 2002, presents a business card and ruler combination. This publication provides a measurement capability, and when retracted will fit in a wallet credit card pocket. However, the measurement component consists of foldable ruler segments, which by their very nature are semi-rigid and hence is much thicker than the thickness of a typical tape measure ribbon. Furthermore the width of the ruler when extended is slightly less than the width of the business card, which is considerably wider than a typical tape measure ribbon.

The promotional products company FortePromo offers online a business card tape measure with a 5 ft retractable ribbon that will accommodate advertising information. This is a miniature version of the standard retractable tape measure with a case in the shape of a business card. However the width of the case is ⅜ inch, which is too thick to fit in a credit card pocket of a wallet.

In addition to the patent literature, the retail establishment IKEA makes available to their customers a free 40-inch disposable paper tape measure ribbon that is intended to be used in their store while the customer shops. However a customer is free to take the tape measure home, and the ribbon may be folded as shown in FIG. 1a so it fits into a standard credit card-sized wallet pocket or in a notebook pocket. However when used in this way, the tape measure is not durable, and fits awkwardly in the credit card pocket.

In spite of the wide array of tape measure products commercially available, none are durable and capable of being stored snugly in a pocket of a wallet that has been designed to store credit cards and business cards, or in a notebook auxiliary pocket designed to hold several sheets of paper.

SUMMARY OF THE INVENTION

FIGS. 2a, 2b, 2c, 2d, 3a and 3b show frontal perspective views of a embodiment of the invention. The embodiment is composed of a rectangular card, a tape measure ribbon attached to the card at the top front so the ribbon is divided into two equal sections, and a case. The attachment is designed so that the ribbon can be either extended so it can be used to measure lengths, or so that the ribbon can be wrapped around the card; the left side of the ribbon wrapped around the card on the left side, the right side of the ribbon wrapped around the card on the right side. When the ribbon is so wrapped around the card and the wrapped ribbon is stored in the case, the tape measure is in its retracted mode. If the auxiliary pocket is a wallet credit card pocket, the tape may be sized to fit in that pocket, yet extend to over three feet or more

LIST OF FIGURES

Figure 3A:
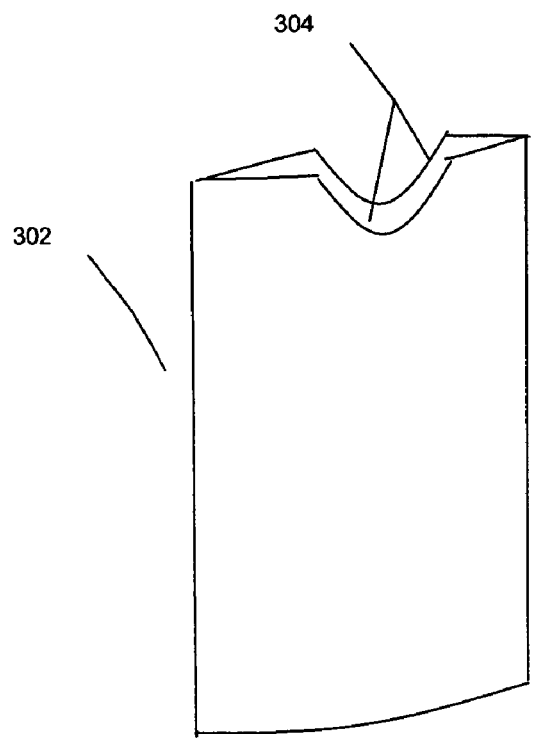
Figure 3B:
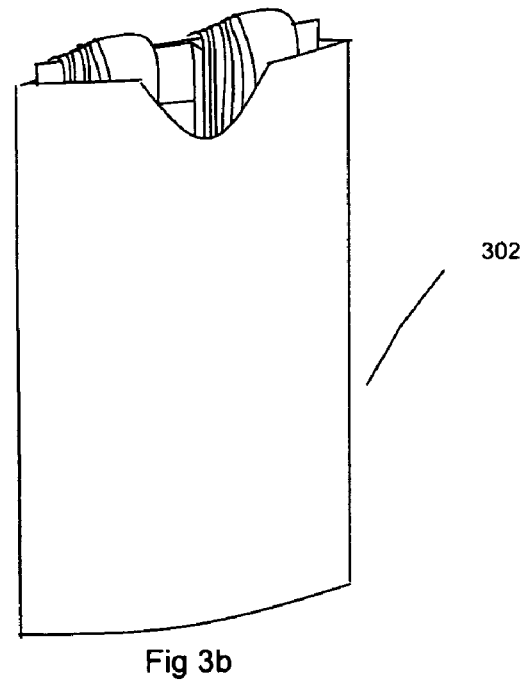

FIGS. 1a and 1b shows two prior art tape measure designs.
FIGS. 2a and 2b show the tape measure ribbon and rectangular card of embodiment one.
FIGS. 2c and 2d shows the ribbon being wrapped around the card of embodiment one.
FIG. 3a shows the case for all the embodiments.
FIG. 3b shows the case containing the ribbon and the card of embodiment one.
FIGS. 4a and 4b show the tape measure ribbon and rectangular card of embodiment two.
FIGS. 4c and 4d shows the ribbon being wrapped around the card of embodiment two.
FIGS. 5a and 5b show the tape measure ribbon and rectangular card of embodiment three.
FIG. 5c shows the ribbon being wrapped around the card of embodiment three.

DETAILED DESCRIPTION OF THE INVENTION

Embodiment One

FIGS. 2a, 2b, 2c, 2d, 3a and 3b show a first embodiment of the invention designed to fit in an auxiliary pocket. The embodiment is composed of a tape measure ribbon 102, a thin, substantially rigid rectangular card 202 to which the tape measure is attached and a case 302 which stores the ribbon and card when not in use. The case is made of a thin flexible material. The card 202 is sized so it will fit snugly in the case when the ribbon is wrapped around it. The ribbon is made of a thin white non-extensible flexible material. It has indicia representing inches as in the standard manner used in tape measures. It has a width less than half the width of the card but greater than ⅜ the width of the card. It has a thickness and length selected so that the tape measure in its retracted mode will fit in the auxiliary pocket yet have a length that achieves its intended use. Referring to FIGS. 2a and 2b, the flexible non-extensible tape measure ribbon 102 is permanently attached the rectangular card 202. The attachment of the ribbon to the card occurs on a surface within a trapezoidal area 204 located at the top front of the card, centered between the card edges. The trapezoidal surface top has a length less than the width of the card minus twice the width of the ribbon; its sides are at a 45 degree angle from the top, the base of the trapezoid has a length equal to twice the width of the ribbon minus the length of the trapezoid top. The height of the trapezoid is the width of the ribbon.

Referring now to FIG. 2b, the ribbon 102 is attached to the card within the trapezoidal area 204 so that the ribbon is divided into equal lengths on each side of card, and its top edge is flush against the top of the card. The diagonal sides of the trapezoid determine the ribbon fold lines 206 and 208; each fold line starts at the top of the card and is directed to the corresponding edge of the card. The attachment of the ribbon to the card in this manner divides the ribbon into three segments; the left segment 212 lies to the left of the left fold line 206, the right segment 214 lies to the right of the right fold line 208, and the third segment 210 has a trapezoidal shape bounded by the fold lines, the top of the ribbon and the bottom edge of the ribbon. The ribbon 102 and the card 202 attached as described, and the case 302 as described, collectively comprises the tape measure of embodiment one.

FIG. 3a shows the construction of the case 302 for the tape measure. The case has width and height the size of a standard credit card. When the ribbon and card are in its retracted mode, it will fit in the case snugly yet can be removed easily. The case is rectangular in shape and is constructed out of a thin material and is closed on the sides and bottom. The top of the case is open to accommodate the tape measure ribbon and card. It has cutouts 304 at the top front and rear of the case so the tape measure can be easily grasped for removal from the case. The tape measure in its retracted mode as shown in FIG. 3b is sized so it fits in the auxiliary pocket.

For example, if the auxiliary pocket is a credit card pocket of a wallet, and the tape measure thickness is required to be less then the thickness of three credit cards, the following tape measure sizing, yielding a 40 inch ribbon, provides a theoretical selection of component sizing that meets the requirement.

Referring to FIGS. 2a, 2b, 2c, 2d, 3a and 3b, the case has an outside width of 5.5 cm (2.2 in), height of 8.5 cm (3.4 in), total thickness of 20 mil (0.02 in). The card 202 has width 5 cm (3 in), height 8.5 cm (2.2 in) and a thickness of 35 mil (0.035 in). The ribbon 102 has a length of 102 cm (40 in), a width of 2 cm (0.79 in) and a ribbon thickness of 7 mil (0.007 in). In its retracted mode, the ribbon on each side of the card is wrapped around the car 6 times, yielding a thickness of 42 mil. If the fold overlap at the trapezoid where the ribbon is folded at a 45 degree angle is included, the contribution of the ribbon to the tape measure thickness 7 ties the ribbon thickness, i.e. 49 mil. The trapezoidal surface top has a length of 0.5 cm (0.2 in), its sides are at a 45 degree angle from the top, the base of the trapezoid has a length of 4.5 cm (1.8 in) and the height of the trapezoid is 2 cm (0.79 in). The tape measure in its retracted mode as shown in FIG. 3b has a tape measure thickness determined by adding 7 times the thickness of the ribbon, the thickness of the empty case and the thickness of the card. This computes to 104 mil (0.104 in), which is less than the thickness of three standard credit cards of 105 mil (0.105 in). With these dimension, the flat and thin tape measure will fit snugly in a wallet credit card pocket yet yield a 40 inch ribbon when extended.

A more general sizing formula may be given as follows: The number of ribbon segments in the ribbon wrapping for embodiment one is number of ribbon segments=RU(card height)/(ribbon length*0.5))+x where the function RU rounds up the number to its nearest integer, and x takes the value 1 if the ribbon overlap occurring at the diagonal ribbon is to be taken into account in calculating tape measure thickness, or 0 otherwise.

The tape measure thickness is then given by $$\text{Tape measure thickness} = (\text{number of ribbon segments}) \\ (\text{ribbon thickness}) + \text{card thickness} + \\ \text{case thickness}$$

Embodiment one as presented in the example is sized to fit in a credit card pocket of a wallet. It is straightforward for a person skilled in the art to resize the tape measure so it fits snugly in a different auxiliary pocket such as that as a pocket located on the inside cover of a notebook.

Use of Embodiment One

Referring to FIG. 2b, when the tape measure is in the extended mode for measuring, it stretches to its full length as indicated in FIG. 2b, while remaining attached to the card.

Referring now to FIGS. 2b and 2c, to fold the tape measure into its retractable mode for storage in its case, the left 212 and right 214 segments of the ribbon are first folded forward and down at the fold lines 206 and 208 so that the tape left segment 212 and right segment 214 are parallel to each other and lie against the front of the card as shown in FIG. 2c. The left segment of the tape measure 212 and the right segment 214 are then both wrapped tightly around the card so it takes the configuration as shown in FIG. 2d. The wrapped ribbon is then put in the case as shown in FIG. 3b. The wrapping of the two segments may be done simultaneously so it retracts easily and quickly.

This completes the detailed description of embodiment one.

Embodiment Two

FIGS. 4a, 4b, 4c and 4d show perspective views of the second embodiment. Only the differences between this embodiment and the first embodiment are discussed here. The card 402 has diagonal printed lines 404 and 406 located near the top center of the card, instead of the diagonal fold lines 206 and 208 of embodiment one. These lines indicate where to place the ribbon when putting it in the retracted mode. It also has two diagonal fold lines 408 and 410 on the ribbon, located midway between the ends of the ribbon. These lines indicate where to fold the ribbon.

The tape measure ribbon 102, instead of being permanently attached as in embodiment one, is placed against the card when it is being put in the retracted mode. To retract the tape measure, the ribbon is placed against the card with the fold lines 408 and 410 of the ribbon placed over the printed lines 404 and 406 of the card. The ribbon is then folded along the lines 408 and 410 so hangs down from the card in two parallel sections as shown in FIG. 4c. Then holding the ribbon in place with one hand, the user wraps the ribbon around the card with the other hand as in embodiment one.

Use of Embodiment Two

Embodiment two is extended or retracted in essentially the same way as embodiment one; the only differences are that the ribbon is held in place by the user when it is being retracted in embodiment two, while it is attached in embodiment one; and when it is put in the extended mode, it is separated from the card and functions as a standalone tape measure.

Embodiment Three

FIGS. 5a, 5b, and 5c show perspective views of the third embodiment. Only the differences between this and the first embodiment are discussed here. The tape measure ribbon 102 has a width half that of the width of the ribbon of embodiment one and has a length that is double the length of the ribbon in embodiment one. The card 502 has guide notches 510 on the card's bottom and the card's top that guides the ribbon when it is being put in the retracted mode. The tape measure ribbon 102, instead of being permanently attached as in embodiment one, is simply wrapped around the card in overlapping segments as shown in FIG. 5c. When it is in the extended mode, the ribbon is separated from the card. The tape measure thickness of embodiment three is approximately the same as embodiment one.

Use of Embodiment Three

Embodiment three is extended or retracted as follows. To go from the extended mode to the retracted mode, one end of the tape measure is placed against the front of the card toward the left edge near the top of the card as shown in FIG. 5b. The ribbon is then wrapped around the card, staggering successive wraps so the ribbon extends across the card ending towards the right side of the card. The ribbon is constrained to lie within the notch 510 on the bottom and top of the card.

This completes the description of the third embodiment.

Discussion

The tape measure embodiments described in this document provides explicit examples of this invention sized to fit in a credit card pocket; but it is not intended to limit the scope that the invention offers. For example, the ribbon may be made of a wide variety of thin non-extensible flexible ribbons composed of material such as, but not limited to, Mylar, polyvinyl chloride, polyethylene, nylon rayon, or fiber reinforced paper. The ribbon material should be as thin as possible, while remaining durable and non-extensible. The width of the ribbon may range from half the width of the card to a small faction of that width. The ribbon material must accommodate the printing of the measurement indicia; typically tick marks indicating units of centimeters, inches or both. The substantially rigid rectangular card preferably has, but is not restricted to, a thickness of 35 mil or less. The case can be made of various semi rigid materials such as, but not restricted to, vinyl, acetate or cardstock. The particular way the ribbon is wrapped around the card may vary from the embodiments presented here, as long as the concept of the invention is adhered to.

When one of these embodiments or its variations is implemented, the case may have advertising indicia for a business, organization or an individual. Additional advertising or informational indicia may be added to the ribbon or card. For example, the rectangular card may contain information such as length, weigh and volume conversion units; have additional properties such as having a magnifying capability; or have other functionality such as having holes or markings that can be used to determine the diameter of wires, the thread pitch and diameter of screws and bolts, or the thickness of thread.

The disclosure presented herein gives three embodiments of the invention. These embodiments are to be considered as only illustrative of the invention and not a limitation of the scope of the invention. Various permutations, combinations, variations and extension of these embodiments are considered to fall within the scope of this invention. Therefore the scope of this invention should be determined with reference to the claims and not just by the embodiments presented herein.

What is claimed is:

1. A tape measure apparatus comprising:
   an approximately rectangular card,
   a tape measure ribbon having a width not greater than half the width of said card,
   a case configured to receive said ribbon when said ribbon is wrapped around said card,
   whereby when said tape measure apparatus is in a retracted mode, said ribbon is wrapped nicely around said card and said wrapped ribbon is stored in said case, and whereby when tape measure apparatus is in an extended mode, said wrapped ribbon is removed from said case and unwrapped from said card.

2. The tape measure apparatus of claim 1 additionally comprising a method for sizing the tape measure apparatus components to fit in an auxiliary pocket.

3. The tape measure apparatus of claim 1 wherein said tape measure apparatus components are sized so that said case has the width and height approximately of a standard credit card, and said tape measure apparatus has a tape measure thickness of less than the thickness of 6 standard credit cards.

4. A tape measure apparatus configured to be stored in an auxiliary pocket when it is in its retracted mode comprising:
   an approximately rectangular case,
   an approximately rectangular semi-rigid card,
   a durable, non-extensible flexible tape measure ribbon of width not more than half the width of said rectangular card,
   a means for wrapping nicely said ribbon around said card.

5. The tape measure apparatus of claim 4 additionally comprising a method for sizing the tape measure apparatus components to fit in an auxiliary pocket.

6. A tape measure apparatus that extends to a length of at least 91.4 cm (3 feet) when extended, and fits in a credit card pocket of a wallet, has a thickness of less than 6 standard credit cards and has a width approximately the width of a credit card when contracted.

* * * * *